(12) United States Patent
Palmowski et al.

(10) Patent No.: US 12,535,617 B2
(45) Date of Patent: Jan. 27, 2026

(54) SYSTEM AND METHOD FOR REDUCING UNCERTAINTIES IN THERMAL HISTORIES

(71) Applicant: Schlumberger Technology Corporation, Sugar Land, TX (US)

(72) Inventors: Daniel B. Palmowski, Aachen (DE); Thomas Fuchs, Aachen (DE); Adrian Kleine, Aachen (DE)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 1090 days.

(21) Appl. No.: 17/596,147

(22) PCT Filed: Jun. 4, 2020

(86) PCT No.: PCT/US2020/036046
§ 371 (c)(1),
(2) Date: Dec. 3, 2021

(87) PCT Pub. No.: WO2020/247579
PCT Pub. Date: Dec. 10, 2020

(65) Prior Publication Data
US 2022/0236447 A1 Jul. 28, 2022

Related U.S. Application Data

(60) Provisional application No. 62/856,954, filed on Jun. 4, 2019.

(51) Int. Cl.
*G06F 7/48* (2006.01)
*G01V 11/00* (2006.01)
*G01V 20/00* (2024.01)

(52) U.S. Cl.
CPC ............ *G01V 20/00* (2024.01); *G01V 11/002* (2013.01); *G01V 2210/66* (2013.01)

(58) Field of Classification Search
CPC ............... G01V 11/002; G01V 20/00; G01V 2210/6124; G01V 2210/66; G01V 2210/661
See application file for complete search history.

(56) References Cited

U.S. PATENT DOCUMENTS

| 10,605,955 | B2 | 3/2020 | Palmowski et al. | |
| 2011/0264430 | A1* | 10/2011 | Tapscott | G01V 99/00 703/10 |

(Continued)

FOREIGN PATENT DOCUMENTS

| EP | 2795370 A1 | 10/2014 |
| WO | 2016114881 A1 | 7/2016 |

OTHER PUBLICATIONS

Koptev, A. I., and A. V. Ershov. "Thermal thickness of the Earth's lithosphere: a numerical model." Moscow University Geology Bulletin 66.5 (2011): 323-330. (Year: 2011).*

(Continued)

*Primary Examiner* — Nithya J. Moll
(74) *Attorney, Agent, or Firm* — Jeffrey D. Frantz (57) ABSTRACT

A method includes determining a present-day thickness of a lithosphere. The method also includes determining whether the determined present-day thickness of the lithosphere substantially matches an interpreted present-day thickness of the lithosphere. The method also includes generating or updating a temperature history model in response to determining that the determined present-day thickness of the lithosphere substantially matches the interpreted present-day thickness of the lithosphere.

19 Claims, 9 Drawing Sheets

(56) References Cited

U.S. PATENT DOCUMENTS

2014/0350905 A1 11/2014 Wienecke et al.
2017/0329046 A1* 11/2017 Palmowski ............ G01V 20/00

OTHER PUBLICATIONS

Extended Search Report issued in European Patent Application No. 20819594.1 dated May 26, 2023, 10 pages.
Dan McKenzie, Some remarks on the development of sedimentary basins, Earth and Planetary Science Letters, 40 (1978) 25-32, Elsevier Scientific Publishing Company, Amsterdam, 1978 (8 pages).
Nicky White & Nicky White & Dan McKenzie Formation of the "steer's head" geometry of sedimentary basins by differential stretching of the crust and mantle, Geology, v.16, pp. 250-253, Geological Society of America, 1988 (4 pages).
T. Hantschel, A. I. Kauerauf: Fundamentals of Basin and Petroleum Systems Modeling, Springer, 2009.
G.T. Jarvis and D.P. McKenzie, Sedimentary basin formation with finite extension rates, Earth and Planet Sci. lett., v48, 42-52, 1980, (11 pages).
M.S. Steckler, A.B. Watts: Subsidence of the Atlantic-type continental margin off New York, Earth and Planetary Sci. Letters. v41, 1, pp. 1-13, 1978, (13 pages).
Baur et al. Basin modeling meets rifts analysis—A numerical modeling study from the Jeanne d'Arc basin, offshore Newfoundland, Canada. Marine and Petroleum Geology. Jun. 21, 2009, vol. 27, No. 3, pp. 585-599.
Chen, Lin. Stretching factor estimation for the long-duration and multi-stage continental extensional tectonics: Application to the Baiyun Sag in the northern margin of the South China Sea. Tectonophysics. Nov. 27, 2013, vol. 611, pp. 167-180. (14 Pages).
Prijac et al. Subsidence of the Paris Basin and its bearing on the late Variscan lithosphere evolution: a comparison between Plate and Chablis models. Tectonophysics. Mar. 24, 2000, vol. 323, pp. 1-38.
International Search Report and Written Opinion for the Equivalent PCT/US2020/036046 dated Sep. 17, 2020 (13 Pages).

* cited by examiner

SYSTEM AND METHOD FOR REDUCING UNCERTAINTIES IN THERMAL HISTORIES

CROSS-REFERENCE TO RELATED APPLICATIONS

This application is a National Stage Entry of International Application No. PCT/US2020/036046, filed Jun. 4, 2020, which claims priority to U.S. Provisional Patent Application No. 62/856,954, filed on Jun. 4, 2019, the entirety of which is incorporated herein by reference.

BACKGROUND

An uncertainty in petroleum systems modeling (PSM) is the amount of heat that has entered a sedimentary basin from below through geological time. This is referred to as basal heat flow. In rift basins, the lithospheric layer thicknesses (e.g., crust and upper mantle) of the outer earth are factors used to define the basal heat flow. Conventional workflows that generate a model of the thickness variations for the lithospheric layer through geological time apply the isostatic principle to a stretching model to invert the observed basin subsidence (e.g., sediment and water filled) into a thickness variation of the respective layers. This workflow is often called subsidence inversion to stretching. It is also referred to as the "McKenzie Model."

Conventional modeling software may be used to calculate lithospheric layer thicknesses and/or stretching factors of the lithospheric layer. However, the implemented forward modeling inversion tools estimate the initial lithosphere (e.g., at the start of the basin formation). This initial state is not known and is generally estimated based on the definition of a default lithosphere (e.g., average thicknesses of "undeformed" lithosphere). The thickness values of the estimated initial lithosphere may fundamentally influence the inversion itself. In addition, these estimations may affect the resulting thermal history of the basin. It is the thermal history model that may eventually drive petroleum systems predictions. Thus, the current implementation, though widely accepted and used, introduces an uncertainty into the thermal modeling process due to the estimations. Even if this uncertainty is fully integrated into the petroleum systems analysis, inaccurate or at least very uncertain predictions may still result.

SUMMARY

A method for reducing uncertainties in thermal histories is disclosed. The method includes determining a present-day thickness of a lithosphere. The method also includes determining whether the determined present-day thickness of the lithosphere substantially matches an interpreted present-day thickness of the lithosphere. The method also includes generating or updating a temperature history model in response to determining that the determined present-day thickness of the lithosphere substantially matches the interpreted present-day thickness of the lithosphere.

A computing system is also disclosed. The computing system includes one or more processors and a memory system. The memory system includes one or more non-transitory computer-readable media storing instructions that, when executed by at least one of the one or more processors, cause the computing system to perform operations. The operations include determining a first estimate of a tectonic subsidence through time in a subterranean formation. The operations also include determining a first estimate of an initial thickness of a lithosphere in the subterranean formation. The operations also include running a model of the subterranean formation. The operations also include determining an amount that an upper mantle of the lithosphere varies in thickness through time. The operations also include determining a second estimate of the tectonic subsidence through time in the subterranean formation. The operations also include determining a present-day thickness of the lithosphere based at least partially upon the amount that the upper mantle of the lithosphere varies in thickness, the second estimate of the tectonic subsidence through time, or both.

A non-transitory computer-readable medium is also disclosed. The medium stores instructions that, when executed by at least one processor of a computing system, cause the computing system to perform operations. The operations include determining a first estimate of a tectonic subsidence through time in a subterranean formation based at least partially upon a burial history of the subterranean formation. The operations also include determining a first estimate of an initial thickness of a lithosphere in the subterranean formation. The first estimate of the initial thickness of the lithosphere comprises a sum of an initial thickness of a crust and an initial thickness of an upper mantle. The operations also include running a model of the subterranean formation based at least partially upon the first estimate of the tectonic subsidence through time, the first estimate of the initial thickness of the lithosphere, or both. The operations also include determining an amount that an upper mantle of the lithosphere varies in thickness through time based at least partially upon the model. The operations also include determining a second estimate of the tectonic subsidence through time in the subterranean formation based at least partially upon the model. The operations also include determining a present-day thickness of the lithosphere based at least partially upon the amount that the upper mantle of the lithosphere varies in thickness, the second estimate of the tectonic subsidence through time, or both. The operations also include generating or updating a temperature history model of the subterranean formation based at least partially upon the determined present-day thickness of the lithosphere.

It will be appreciated that this summary is intended merely to introduce some aspects of the present methods, systems, and media, which are more fully described and/or claimed below. Accordingly, this summary is not intended to be limiting.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques, and workflows that are in accordance with some embodiments. Some operations in the processing procedures, methods, techniques, and workflows disclosed herein may be combined and/or the order of some operations may be changed.

Figure 1:
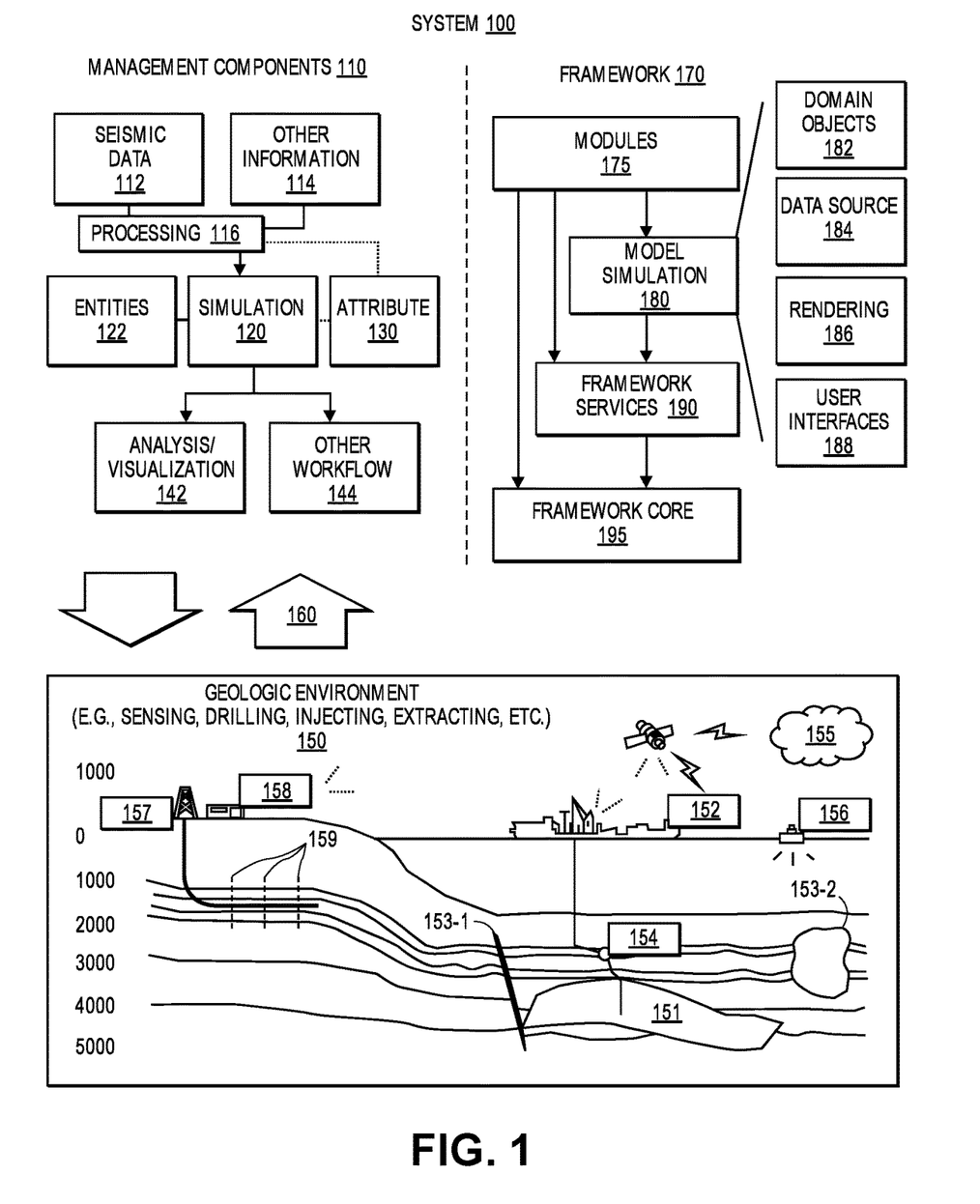
FIG. 1 illustrates an example of a system that includes various management components to manage various aspects of a geologic environment, according to an embodiment.

FIG. 1 illustrates an example of a system 100 that includes various management components 110 to manage various aspects of a geologic environment 150 (e.g., an environment that includes a sedimentary basin, a reservoir 151, one or more faults 153-1, one or more geobodies 153-2, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, bodies, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. A commercially available example of an object-based framework is the MICROSOFT® .NET® framework (Redmond, Wash.), which provides a set of extensible object classes. In the .NET® framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE™ reservoir simulator (Schlumberger Limited, Houston Texas), the INTERSECT™ reservoir simulator (Schlumberger Limited, Houston Texas), etc. As an example, a simulation component, a simulator, etc. may include features to implement one or more meshless techniques (e.g., to solve one or more equations, etc.). As an example, a reservoir or reservoirs may be simulated with respect to one or more enhanced recovery techniques (e.g., consider a thermal process such as SAGD, etc.).

In an example embodiment, the management components 110 may include features of a commercially available framework such as the PETREL® seismic to simulation software framework (Schlumberger Limited, Houston, Tex.). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a commercially available framework environment marketed as the OCEAN® framework environment (Schlumberger Limited, Houston, Tex.) allows for integration of add-ons (or plug-ins) into a PETREL® framework workflow. The OCEAN® framework environment leverages .NET® tools (Microsoft Corporation, Redmond, Washington) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and one or more other features such as the fault 153-1, the geobody 153-2, etc. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or instead include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

Reducing Uncertainties in Thermal Histories

The systems and methods described herein are directed to inverting the syn-rift and post-rift subsidence of a rift basin using present-day lithospheric thickness values and/or stretching factors, taking the individual behaviors into account without using an estimated initial lithosphere value. This may help to reduce the uncertainty found in conventional modeling. The inputs to the inversion tool may include the tectonic subsidence. The inputs may also include the present-day lithospheric thicknesses. The inputs may also include a definition of the basin-forming processes through geological time (e.g., stretching of the lithosphere, cooling of the lithospheric mantle, loading and unloading of the lithosphere, etc.). As used herein, "present-day" refers to within the last 10 years, within the last 5 years, within the last 1 year, within the last 6 months, within the last 1 month, within the last week, or today. In contrast, "initial" and/or "past" refers to more than ten years ago, for example, more than 1000 years ago, more than 100,000 years ago, or more than 1,000,000 years ago.

The backward inversion of the tectonic subsidence using a reverse modeling approach of the current method may provide the "initial lithosphere" as a result, rather than as an input. The definition of the present-day lithosphere is a workflow based on remote sensing data (e.g., gravity, magnetics) and/or seismic data (e.g., deep seismic profiles that image crustal features). Satellite potential field data may also be used, and its interpretation delivers geologically-consistent models of the present-day lithospheric thicknesses.

Insufficient knowledge about the initial lithospheric thicknesses, prior to basin formation, makes the results of the conventional inversion methodologies of the tectonic subsidence uncertain. The systems and methods disclosed herein may reduce or remove this limitation of the existing "McKenzie inversion tool" and may reduce the uncertainties in the temperature history modeling for petroleum systems analysis.

Figure 2A:
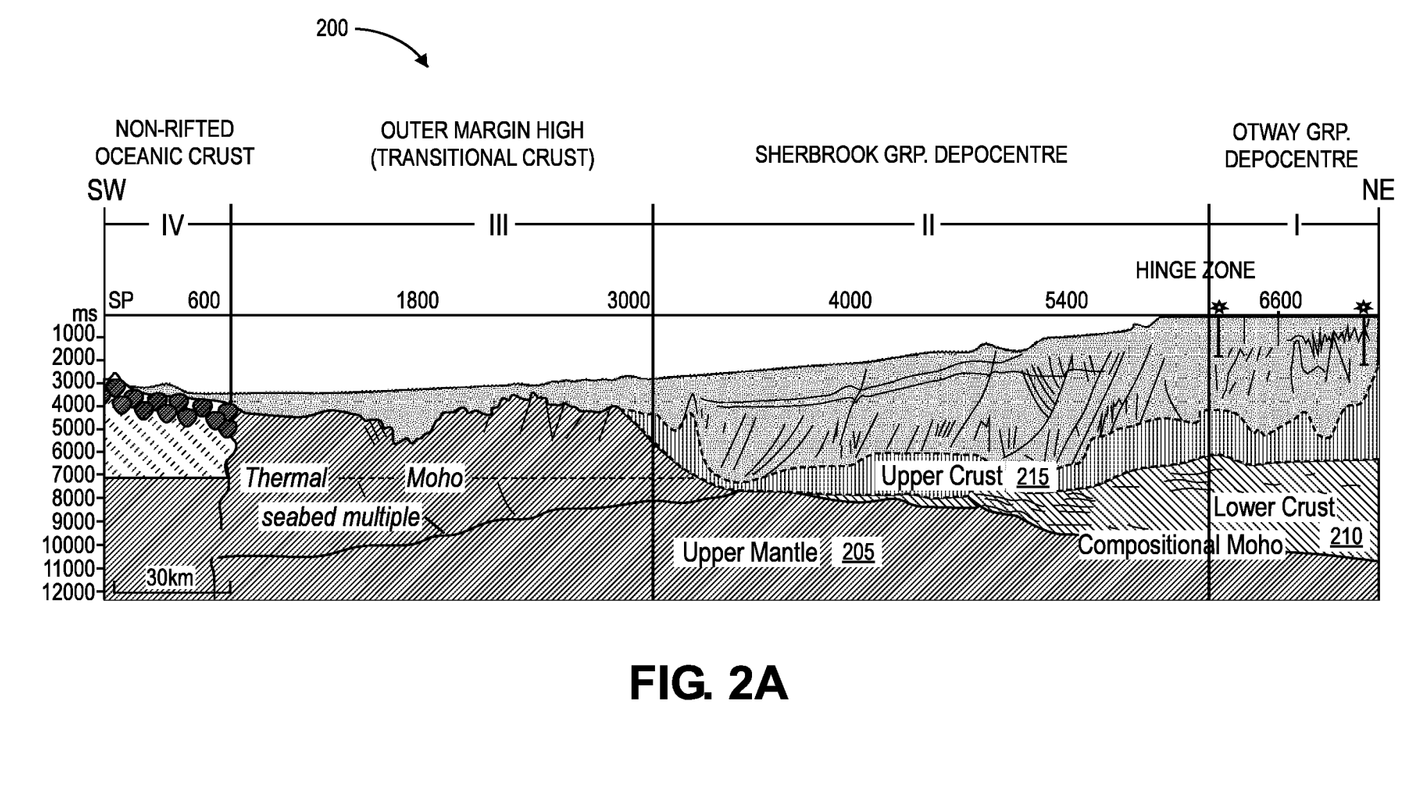
FIG. 2A illustrates a cross-sectional view through a passive margin imaged by a deep seismic line, according to an embodiment.
Figure 2B:
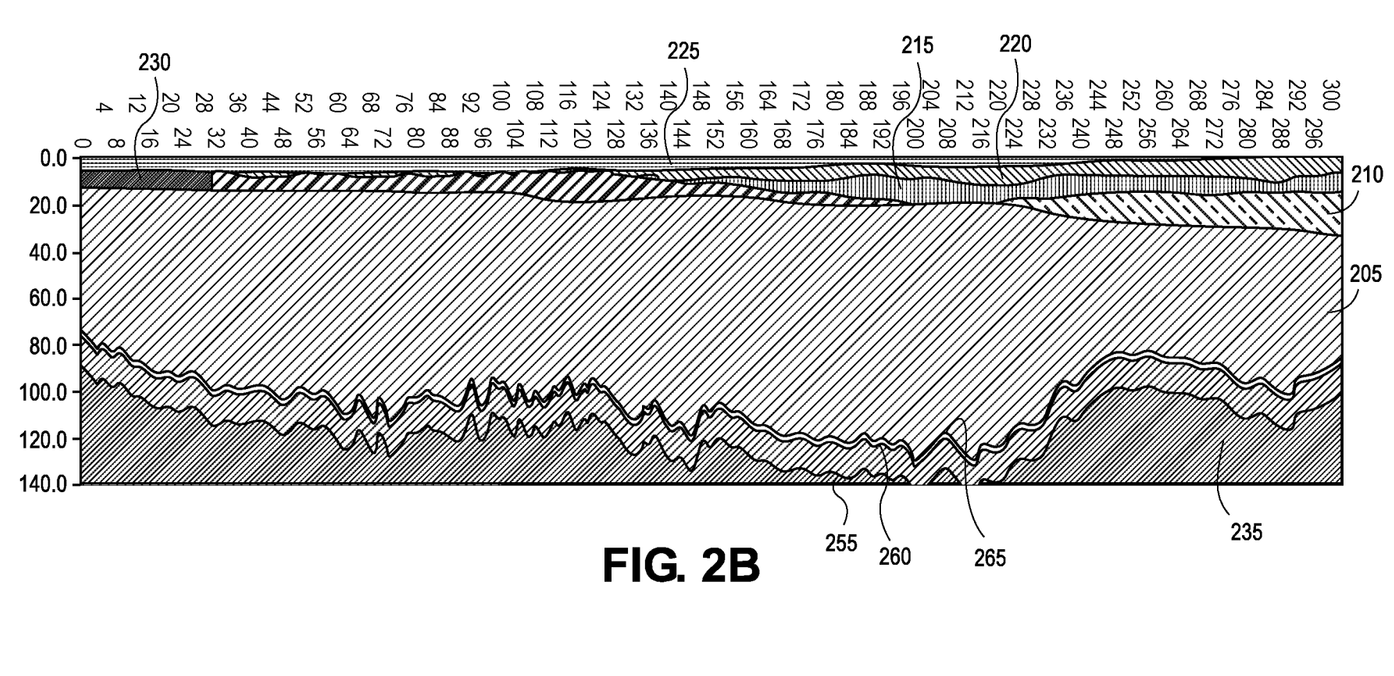
FIG. 2B illustrates an image of a thickness of the lithosphere at present-day, according to an embodiment.

In addition, the systems and methods disclosed herein may reduce the uncertainty of conventional workflows by instead using the present-day lithospheric layer thicknesses as an input. There is a large amount of present-day data available to define the thicknesses with relatively little uncertainties. An example of this is shown in FIGS. 2A and 2B. More particularly, FIG. 2A illustrates a cross-sectional view of a subterranean formation 200 including a passive margin interpreted from a deep seismic line, according to an embodiment. For example, FIG. 2A shows the interpretation of seismic data, and the interpretation is a passive continental margin. In FIG. 2A, the continent side is in the northeast (right side of FIG. 2A), and the ocean side is in the southwest (left side of FIG. 2A). The continental margin ends with the first appearance of oceanic crust. FIG. 2A also shows the upper mantle 205, the lower crust 210, and the upper crust 215. In an example, the present-day crustal structures and thicknesses can be directly interpreted based upon one or more seismic images, as shown in FIG. 2A. However, this is one way to determine the present-day crustal structure and thicknesses, and other ways are also possible.

In one embodiment, the base of the lithosphere may not be imaged. However, the integration of additional data such as gravity, magnetics, and/or present-day temperature data can be used to define the thickness of the lithospheric mantle at present-day, as shown in FIG. 2B. FIG. 2B shows the upper mantle 205, the lower crust 210, and the upper crust 215. FIG. 2B also shows the sediment 220, the water 225, and the oceanic crust 230. Below the upper mantle 205 is the lower mantle 235, which is part of the asthenosphere. The three lines 255, 260, 265 represent differences in depth of the base of the lithosphere (e.g., the lower mantle 205), which are ranges of plausible uncertainties.

The systems and methods disclosed herein may use the tectonic subsidence to invert to changes in the lithospheric layer thicknesses through geological time. However, in contrast to conventional systems and methods, the thicknesses described herein may proceed backward in time, starting at present-day.

Figure 3A:
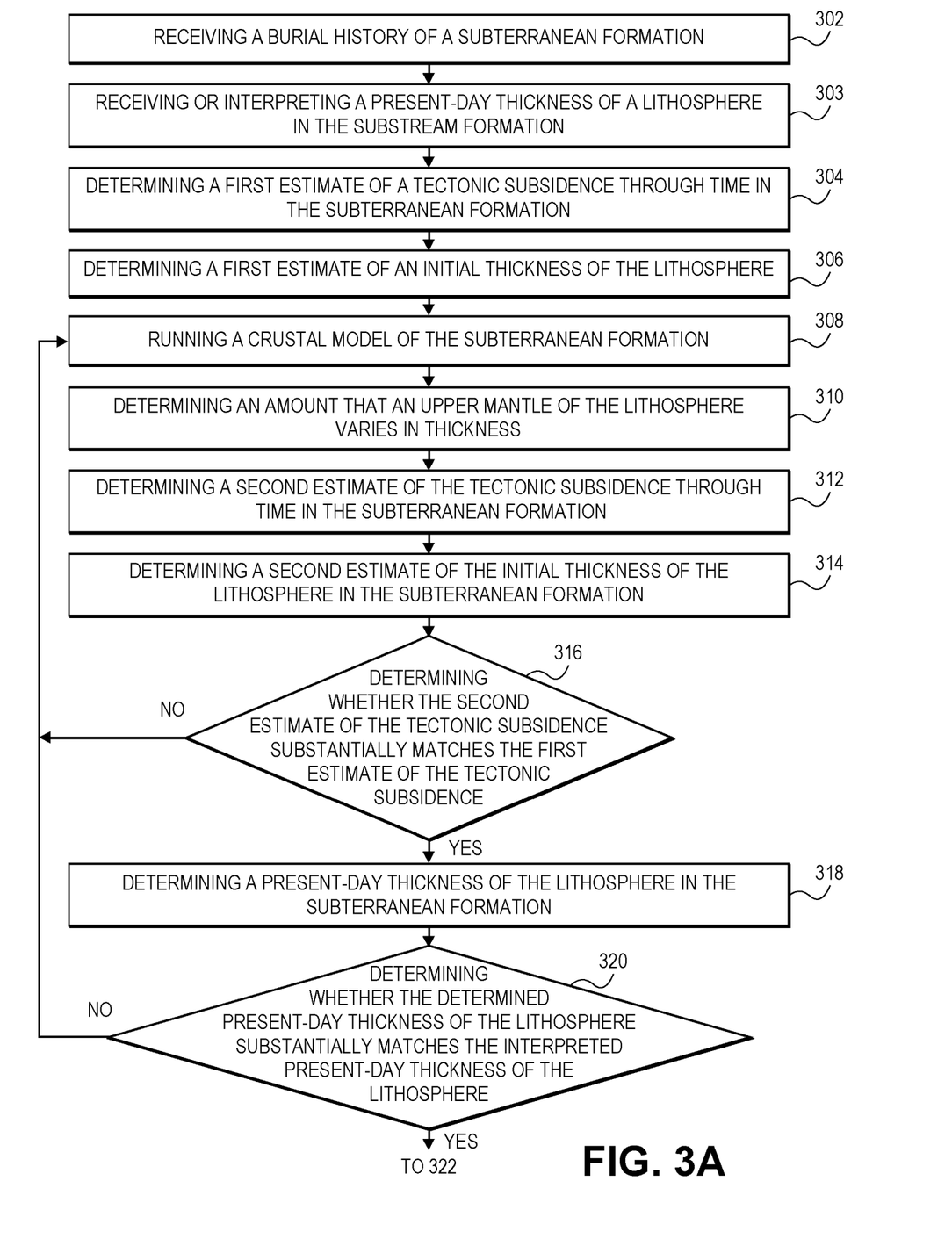
FIGS. 3A and 3B illustrate a flowchart of a method for building or updating a temperature history model for petroleum systems analysis, according to an embodiment.
Figure 3B:
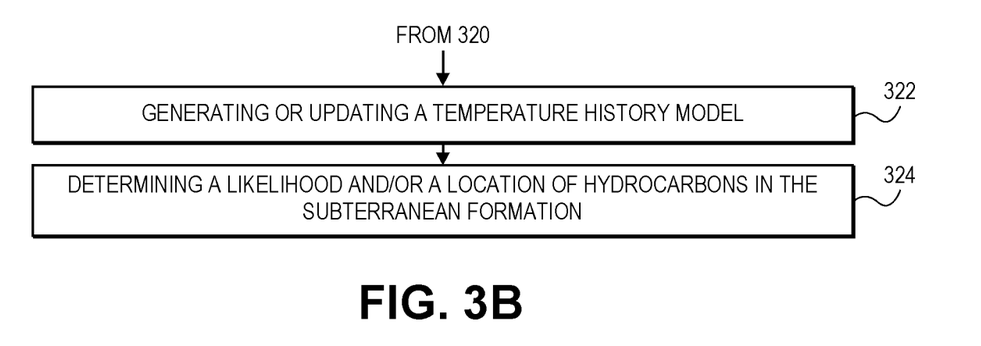

FIGS. 3A and 3B illustrate a flowchart of a method 300 for building or updating a temperature history model for a subterranean formation, according to an embodiment. The temperature history model may be used as part of a petroleum systems analysis. An illustrative order of the method 300 is provided below. However, one or more portions of the method 300 may be performed in a different order, repeated, or omitted.

The method 300 may include receiving a burial history of a subterranean formation, as at 302. As used herein, a "burial history" refers to the description of how a specific subterranean formation was buried by subsequent (after its own deposition) deposition of sedimentary layers above. The burial history may be determined by a petroleum system model (PSM). Petroleum system modeling refers to a technique used to represent the history of a subterranean formation (e.g., a sedimentary basin), including the processes and components used to form petroleum: a petroleum source rock, a reservoir, a trapping mechanism, a seal, and the appropriate relative timing of formation of these. Using geologic, geophysical, and engineering data, scientists create a model of the subterranean formations that can be used to understand whether petroleum is present and how much might exist in potential traps. Petroleum systems models can be used to help predict pore pressure and plan well construction and field development. A useful petroleum systems model can be used to identify and explain inconsistencies in the data. The resulting models may be used during exploration for identifying resource richness, such as sweet spots in unconventional plays such as shale gas, and during field development and production for improving completion efficiency. Petroleum systems modeling is distinct from reservoir simulation in that it covers a larger scale that might include multiple oil and gas fields and considers a geologic time frame of millions of years rather than a production time frame of years or decades.

The method 300 may also include receiving a model of a present-day thickness of a lithosphere in the subterranean formation, as at 303. As mentioned above with reference to FIGS. 2A and 2B, the model may include or be based upon present-day seismic images or other geophysical measurements. In at least one embodiment, the present-day thickness of the lithosphere may be interpreted based at least partially upon the model, yielding an interpreted present-day thickness of the lithosphere.

The method 300 may also include determining a first estimate of a tectonic subsidence through time in the subterranean formation, as at 304. The first estimate of the tectonic subsidence through time may be based at least partially upon the burial history. As used herein, "tectonic subsidence" refers to the sinking of the Earth's crust. More particularly, "tectonic subsidence" refers to the water-filled basin subsidence induced by those geological processes within the upper mantle 205 and the crust 210, 215 that are changing the thicknesses of these lithospheric layers through geological time during basin formation.

The method 300 may also include determining a first estimate of an initial thickness of a lithosphere in the subterranean formation, as at 306. The lithosphere may be or include the upper mantle (also referred to as the lithospheric mantle) 205, the lower crust 210, the upper crust 215, or a combination thereof, as shown in FIG. 2A. The lithosphere does not include the lower mantle 235. Rather, the lower mantle 235 belongs to the asthenosphere. The boundary between the lithosphere and the asthenosphere may be defined by the appearance of first melts (e.g., when the rock is partially molten).

In an embodiment, the initial thickness of the lithosphere may be determined based at least partially upon an initial thickness of the crust $d_c^i$ and an initial thickness of the upper mantle $d_m^i$. The initial thickness of the crust $d_c^i$ refers to the initial thickness of the lower crust 210, the initial thickness of the upper crust 215, or a combination (e.g., sum) thereof. For example, the initial thickness of the lithosphere may be a sum of the initial thickness of the crust $d_c^i$ and the initial thickness of the upper mantle $d_m^i$. The initial thicknesses of the crust $d_c^i$ may be determined based at least partially upon a present-day thickness of the crust $d_c^{PD}$ and an inversion-derived stretching factor of the crust $\beta_c$. In an example, the initial thickness of the crust $d_c^i$ may be determined using:

$$d_c^i = \beta_c d_c^{PD} \quad \text{(Equation 1)}$$

The initial thickness of the upper mantle $d_m^i$ may be determined based at least partially upon a present-day thickness of the upper mantle $d_m^{PD}$ and an inversion-derived stretching factor of the upper mantle $\beta_m$. In an example, the initial thickness of the upper mantle $d_m^i$ may be determined using:

$$d_m^i = \beta_m (d_m^{PD} - d_{mt}) \quad \text{(Equation 2)}$$

where $d_{mt}$ refers to the amount of upper mantle thickening in the post-rift phase.

Equations (1) and (2) are examples of at least a portion of a backward inversion process; however, the method 300 is not limited to using these particular equations. The present-day thickness of the crust $d_c^{PD}$ and the present-day thickness of the upper mantle $d_m^{PD}$ may be measured or determined from the interpretation of seismic measurements and potential field analysis. The stretching factor of the crust $\beta_c$ and the upper mantle $\beta_m$ may be determined by a combination of tectonic subsidence inversion workflows and data interpretation.

In one embodiment, as an initial estimate, a user may assume that the initial thickness of the upper mantle and the present-day thickness of the upper mantle are substantially equal: $d_m^i = d_m^{PD}$. In another embodiment, the user may instead use empirical values depending on the initial assumed stretching factors. In one embodiment, the amount of upper mantle thickening in the post-rift phase $d_{mt}$ can be determined from a previous run of a stretching model. As used herein, the "post-rift phase" refers to the time span between the end of the rift-phase and as the phase during which no further stretching occurs, but the lithospheric mantle is cooling back to achieve a thermal equilibrium with the asthenospheric mantle.

The method 300 may also include generating and/or running a crustal model of the subterranean formation, as at 308. The crustal model may be or include a model of the lithospheric layer thicknesses through geological time. The crustal model may be generated or run based at least partially upon the results of step(s) 304 and/or 306. More particularly, the crustal model may be generated or run based at least partially upon the inversion of the tectonic subsidence to variations in the thicknesses. The inversion is not based upon thickness variations; rather, they are the result of the inversion.

The method 300 may also include determining an amount that the upper mantle 205 of the lithosphere varies in thickness $d_{mt}$, as at 310. In at least one embodiment, the variation in the thickness $d_{mt}$ through geological time may be determined using the crustal model (e.g., based upon the results of the crustal model).

The method 300 may also include determining a second estimate of the tectonic subsidence through time in the subterranean formation, as at 312. The second estimate of the tectonic subsidence through time may be determined using the crustal model (e.g., based upon the results of the crustal model). The second estimate of the tectonic subsidence through time may also or instead be determined based upon the variation in the thickness $d_{mt}$.

The method 300 may also include determining a second estimate of the initial thickness of the lithosphere in the subterranean formation, as at 314. In one embodiment, the second estimate of the initial thickness of the lithosphere may be determined using Equations (1) and (2) from step 306 and $d_{mt}$ from step 310. In addition to using Equations (1) and (2) and $d_{mt}$, an inversion process may also be used to determine the second estimate of the initial thickness of the lithosphere. The second estimate of the initial thickness of the lithosphere may yield updated values for the initial thickness of the crust $d_c^i$ and the initial thickness of the upper mantle $d_m^i$.

The method 300 may also include determining whether the second estimate of the tectonic subsidence (from step 312) substantially matches the first estimate of the tectonic subsidence (from step 304), as at 316. As used herein, the two values "substantially match" if the two values are within a predetermined threshold (e.g., a specified precision) of one another. The predetermined threshold (e.g., specified precision) may be user-defined. In an example, the predetermined threshold (e.g., a specified precision) may be within 20% of one another, within 10% of one another, within 5% of one another, or within 1% of one another.

If the second estimate of the tectonic subsidence does not substantially match the first estimate of the tectonic subsidence, the method 300 may loop back around to step 308, and another iteration of the crustal model may be run using the second estimate of the initial thickness (from 314) as an input. In other words, in the second iteration of the crustal model may be based upon the second estimate of the initial thickness (from 314) instead of the first estimate of the initial thickness (from 306).

If the second estimate of the tectonic subsidence does substantially match the first estimate of the tectonic subsidence, then the method 300 may include determining a present-day thickness of the lithosphere in the subterranean formation 200, as at 318. The present-day thickness of the lithosphere may be determined based at least partially upon the second estimate of the tectonic subsidence (from 312), the second estimate of the initial thickness of the lithosphere (from 314), or both.

The method 300 may also include determining whether the determined present-day lithosphere thickness (from 318) substantially matches the interpreted present-day lithosphere thickness (from 303), as at 320. If the determined present-day lithosphere thickness (from 318) does not substantially match the interpreted present-day lithosphere thickness, then the method 300 may loop back around to step 308, 310, 312, or 314 using a current $d_{mt}$ value in Equation 2 as an input. More particularly, the lower crust 210 and/or the upper crust 215 in the determined present-day lithosphere thickness (from 318) may substantially match the lower crust 210 and/or the upper crust 215 in the interpreted present-day lithosphere thickness. If the upper mantle 205 in the determined present-day lithosphere thickness does not substantially match the upper mantle 205 in the interpreted present-day lithosphere thickness, then the method 300 may loop back around to step 308, 310, 312, or 314 using a current $d_{mt}$ value in Equation 2 as an input.

Figure 4:
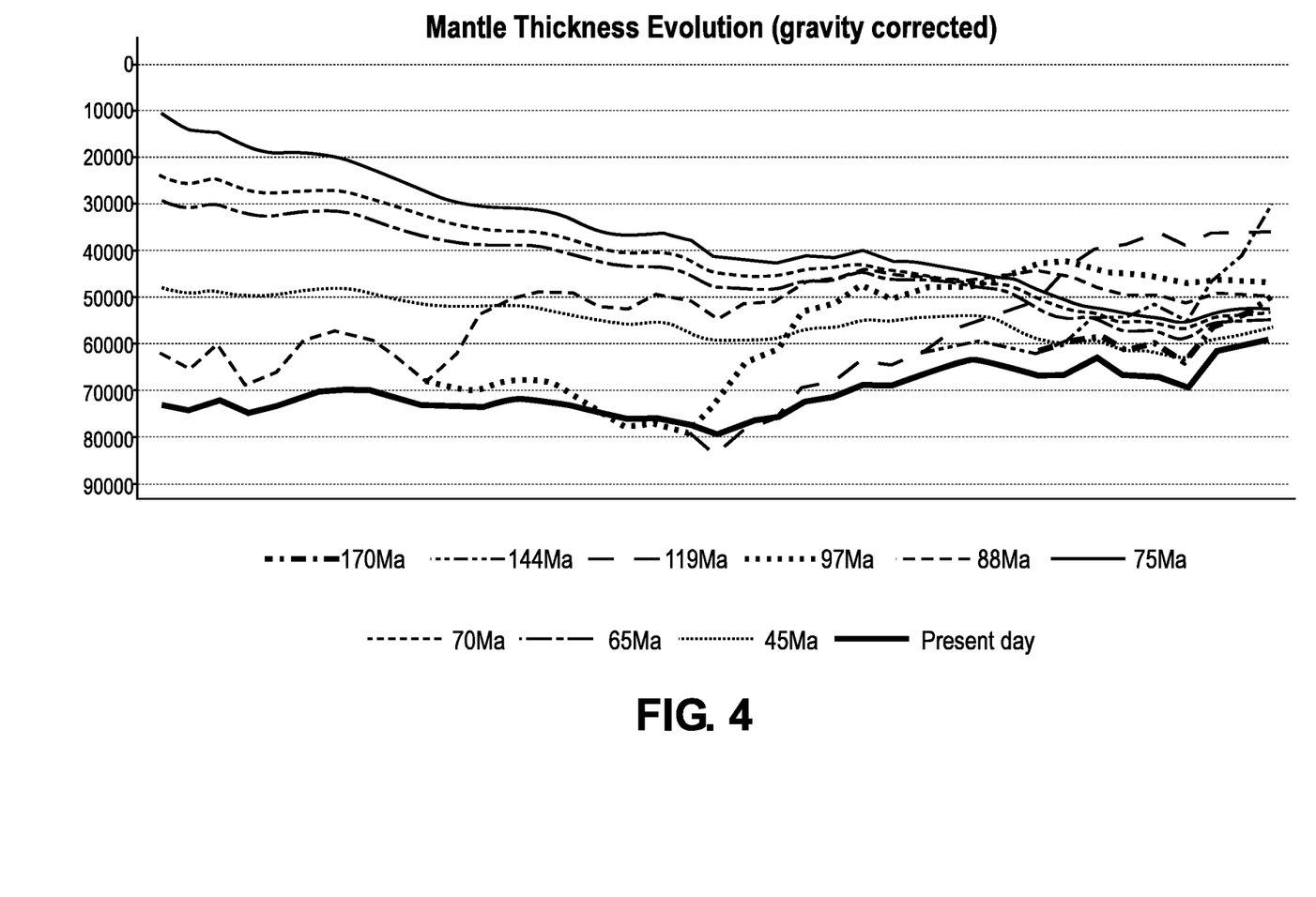
FIG. 4 illustrates a graph showing a mantle thickness evolution, according to an embodiment.

As a result, the method 300 may be used to determine the thickness of the lithosphere (e.g., the thicknesses of the crust and/or upper mantle) through time, including the initial thicknesses of upper mantle 205, the lower crust 210, and/or the upper crust 215, which can be used in a lithospheric layer thickness tool. An example of this is shown in FIG. 4. More particularly, FIG. 4 shows an evolution of the thickness of the upper mantle 220 through geological time with present-day data as inputs and the calculation from a backward model approach, ready to be applied to a petroleum systems model. On the X axis, the units "Ma" refer to million years before present. The Y axis represents thickness in meters.

In at least one embodiment, steps 304, 308, 310, 312, 314, 318, or a combination thereof may be part of a forward inversion. The method 300 goes beyond conventional methods by determining the thickening of the upper mantle 205 of the post-rift phase and using this information to determine the initial thicknesses of the lithosphere based at least partially upon the present-day thicknesses. Equations 1 and 2 are examples of how to perform such a "backward inversion".

If the determined present-day lithosphere thickness (from 318) does substantially match the interpreted present-day lithosphere thickness, then the method 300 may also include generating or updating a temperature history model (e.g., for petroleum systems analysis), as at 322. The temperature history model may be generated or updated based at least partially upon the upper mantle thickening $d_{mt}$ (from 310), the second estimate of the tectonic subsidence (from 312), the second estimate of the initial thickness of the lithosphere (from 314), the present-day thickness of the lithosphere (from 318), the comparison (from 320), or a combination thereof. The method 300 may also include determining a likelihood and/or a location of hydrocarbons in the subterranean formation (e.g., the sedimentary basin) 200, as at 324. The likelihood and/or location may be determined based at least partially upon the temperature history model. In an example, this may include the prediction of when and/or where hydrocarbons may have been produced as well as when and/or where to they may have migrated and accumulated. The user may then formulate a drilling plan based at least partially upon the likelihood and/or location of the hydrocarbons.

Figure 5A:
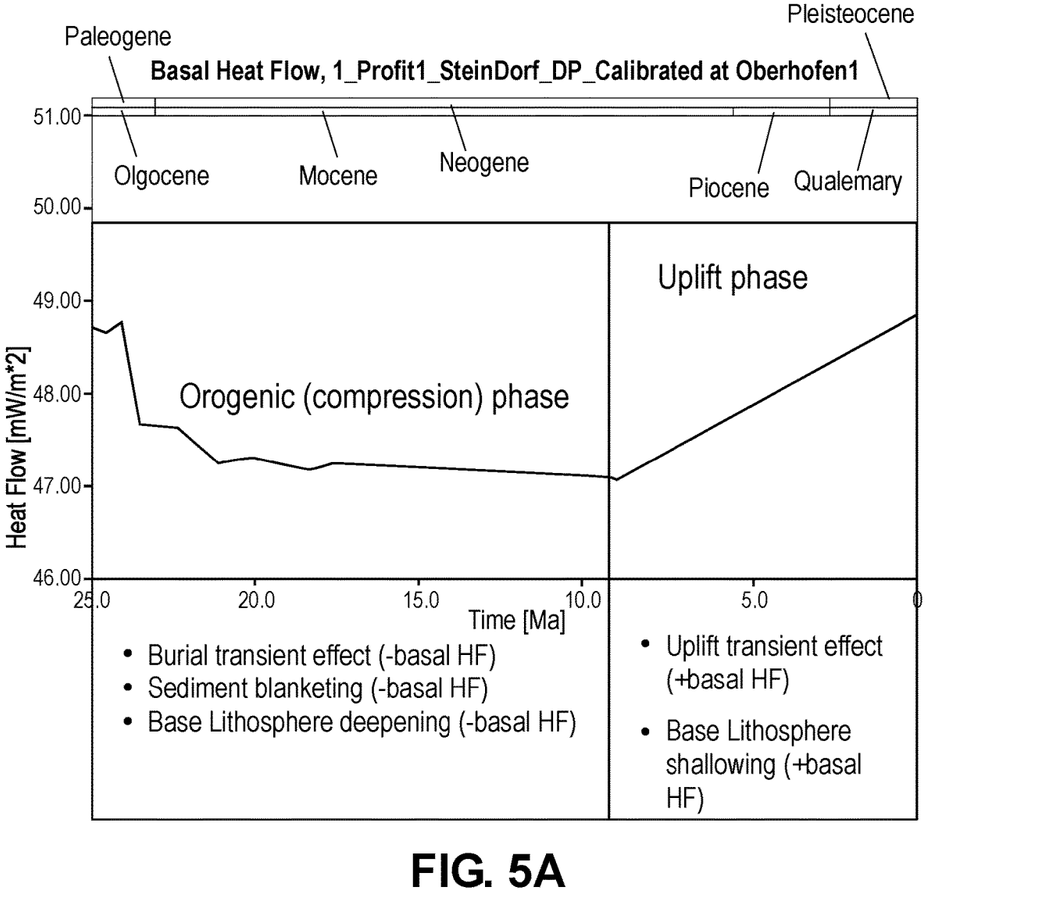
FIG. 5A illustrates a graph showing an example of a burial history in an orogenic (e.g., compression) phase and an uplift phase, according to an embodiment.
Figure 5B:
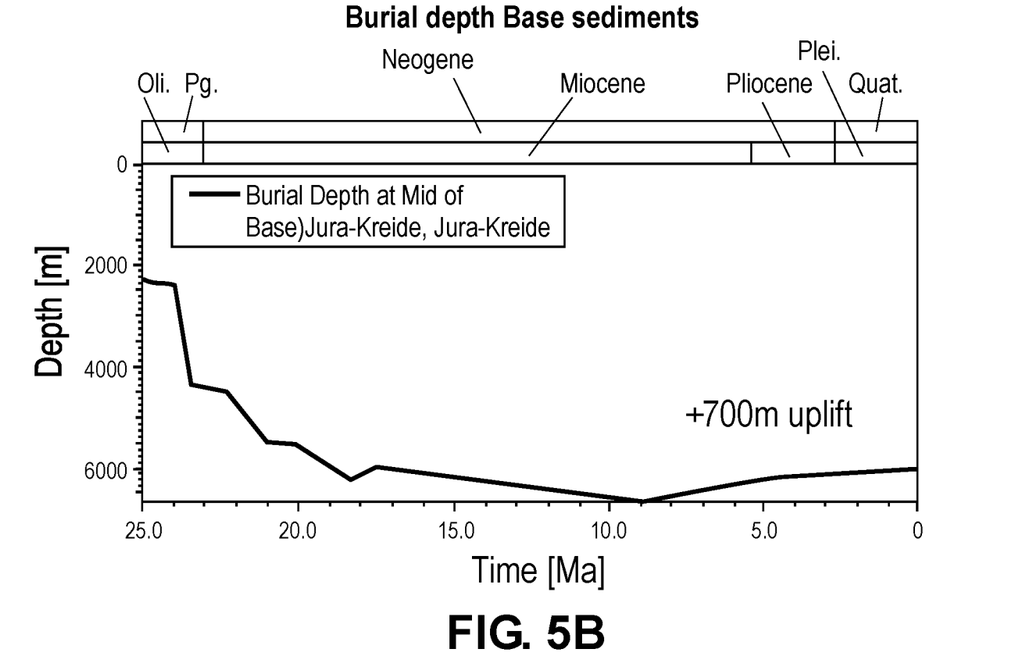
FIG. 5B illustrates a graph showing burial depth base sediments, according to an embodiment.
Figure 5C:
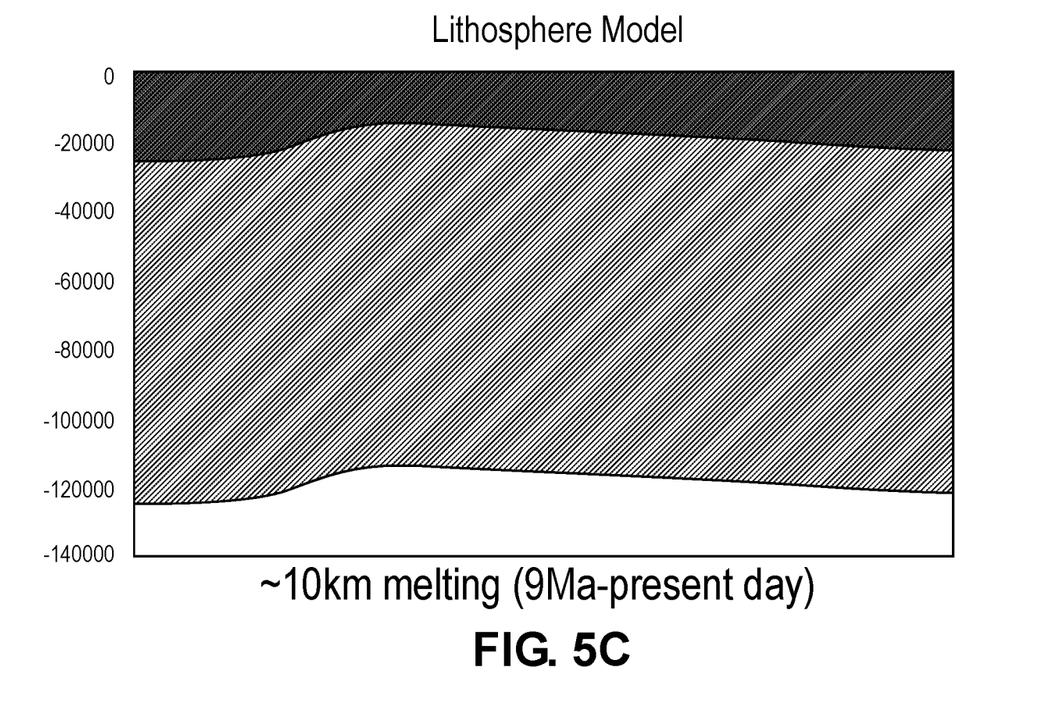
FIG. 5C illustrates a graph showing a lithosphere model, according to an embodiment.

Instead of, or in addition to, the examples provided above, for rifting-related sedimentary basins, the method 300 may also be applied to any basin type, as shown in FIGS. 5A-5C. More particularly, FIGS. 5A-5C apply the method 300 to a foreland basin and illustrate how the definition of the basin forming mechanism influences the inversion routine. In this example, subsidence is loading-driven (e.g., fold and thrust belt). Thus, the method 300 may allow a user to define the episodes of basin forming mechanisms that ensure that the accurate lithospheric processes are used during the tectonic subsidence/uplift inversion.

The method 300 may be used in petroleum systems modeling, to provide resource assessment in a sedimentary basin, to make advanced pressure predictions in the sedimentary basin, or in any application that uses an understanding of temperature history of the sedimentary basin (e.g., cementation, mineral transformation, etc.).

Figure 6:
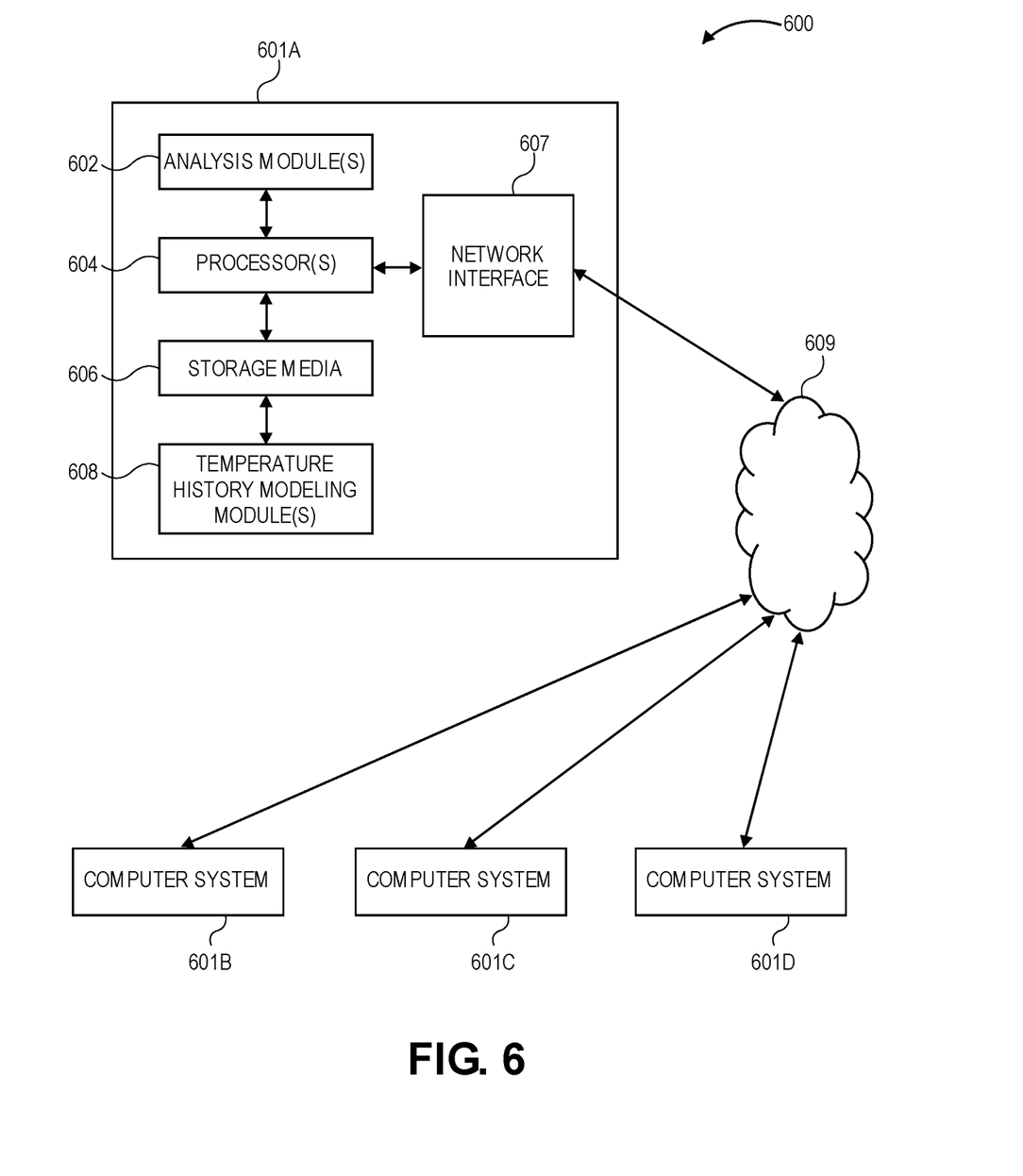
FIG. 6 illustrates an example of a computing system for performing at least a portion of the method(s) disclosed herein, according to an embodiment.

In some embodiments, the methods of the present disclosure may be executed by a computing system. FIG. 6 illustrates an example of such a computing system 600, in accordance with some embodiments. The computing system 600 may include a computer or computer system 601A, which may be an individual computer system 601A or an arrangement of distributed computer systems. The computer system 601A includes one or more analysis modules 602 that are configured to perform various tasks according to some embodiments, such as one or more methods disclosed herein. To perform these various tasks, the analysis module 602 executes independently, or in coordination with, one or more processors 604, which is (or are) connected to one or more storage media 606. The processor(s) 604 is (or are) also connected to a network interface 607 to allow the computer system 601A to communicate over a data network 609 with one or more additional computer systems and/or computing systems, such as 601B, 601C, and/or 601D (note that computer systems 601B, 601C and/or 601D may or may not share the same architecture as computer system 601A, and may be located in different physical locations, e.g., computer systems 601A and 601B may be located in a processing facility, while in communication with one or more computer systems such as 601C and/or 601D that are located in one or more data centers, and/or located in varying countries on different continents).

A processor may include a microprocessor, microcontroller, processor module or subsystem, programmable integrated circuit, programmable gate array, or another control or computing device.

The storage media 606 may be implemented as one or more computer-readable or machine-readable storage media. Note that while in the example embodiment of FIG. 6 storage media 606 is depicted as within computer system 601A, in some embodiments, storage media 606 may be distributed within and/or across multiple internal and/or external enclosures of computing system 601A and/or additional computing systems. Storage media 606 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above may be provided on one computer-readable or machine-readable storage medium, or may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, computing system 600 contains one or more temperature history modeling module(s) 608 that may perform at least a portion of the method 300. It should be appreciated that computing system 600 is merely one example of a computing system, and that computing system 600 may have more or fewer components than shown, may combine additional components not depicted in the example embodiment of FIG. 6, and/or computing system 600 may have a different configuration or arrangement of the components depicted in FIG. 6. The various components shown in FIG. 6 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of the present disclosure.

Computational interpretations, models, and/or other interpretation aids may be refined in an iterative fashion; this concept is applicable to the methods discussed herein. This may include use of feedback loops executed on an algorithmic basis, such as at a computing device (e.g., computing system 600, FIG. 6), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or limiting to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain the principals of the disclosure and its practical applications, to thereby enable others skilled in the art to best utilize the disclosed embodiments and various embodiments with various modifications as are suited to the particular use contemplated.

What is claimed is:

1. A method, comprising:
receiving geophysical data of a subterranean formation, the geophysical data comprising at least one of seismic data, gravity data, magnetic data, temperature log data, or well log data acquired for the subterranean formation;
determining a first estimate of a tectonic subsidence through time in the subterranean formation;
determining a first estimate of an initial thickness of a lithosphere in the subterranean formation;
performing a backward inversion of the tectonic subsidence through time by running a digital crustal model of the subterranean formation, the digital crustal model representing lithospheric layer thicknesses for a plurality of lithospheric layers of the subterranean formation through geological time, the digital crustal model being generated based on the geophysical data of the subterranean formation, wherein the backward inversion is based at least partially upon one or more of the first estimate of the tectonic subsidence through time or the first estimate of the initial thickness of the lithosphere;
determining an amount that an upper mantle of the lithosphere of the subterranean formation varies in thickness through time;
determining a second estimate of the tectonic subsidence through time in the subterranean formation;
determining a present-day thickness of the lithosphere based at least partially upon one or more of the amount that the upper mantle of the lithosphere varies in thickness through time or the second estimate of the tectonic subsidence through time;
determining whether the determined present-day thickness of the lithosphere substantially matches an interpreted present-day thickness of the lithosphere interpreted from the geophysical data of the subterranean formation; and
generating or updating a temperature history model in response to determining that the determined present-day thickness of the lithosphere matches the interpreted present-day thickness of the lithosphere.

2. The method of claim 1, wherein the present-day thickness of the lithosphere is determined based at least partially upon the amount that the upper mantle of the lithosphere varies in thickness through time and the second estimate of the tectonic subsidence through time.

3. The method of claim 1, wherein the present-day thickness of the lithosphere is determined based at least partially upon the first estimate of the initial thickness of the lithosphere.

4. The method of claim 1, further comprising determining, based at least partially upon the temperature history model, one or more of a likelihood that hydrocarbons are present in the lithosphere or a location where the hydrocarbons are present in the lithosphere.

5. A computing system comprising:
one or more processors; and
a memory system comprising one or more non-transitory computer-readable media storing instructions that, when executed by at least one of the one or more processors, cause the computing system to perform operations, the operations comprising:
receiving geophysical data of a subterranean formation, the geophysical data comprising at least one of seismic data, gravity data, magnetic data, temperature log data, or well log data acquired for the subterranean formation;
determining a first estimate of a tectonic subsidence through time in the subterranean formation;
determining a first estimate of an initial thickness of a lithosphere in the subterranean formation;
performing a backward inversion of the tectonic subsidence through time by running a digital crustal model of the subterranean formation, the digital crustal model representing lithospheric layer thicknesses for a plurality of layers of the subterranean formation through geological time, the digital crustal model being generated based on the geophysical data of the subterranean formation, wherein the backward inversion is based at least in part upon one or more of the first estimate of the tectonic subsidence through time or the first estimate of the initial thickness of the lithosphere;
determining an amount that an upper mantle of the lithosphere varies in thickness through time;
determining a second estimate of the tectonic subsidence through time in the subterranean formation; and
determining a present-day thickness of the lithosphere based at least partially upon one or more of the determined amount that the upper mantle of the lithosphere varies in thickness through time or the determined second estimate of the tectonic subsidence through time.

6. The computing system of claim 5, wherein the first estimate of the tectonic subsidence through time is based at least partially upon a burial history of the subterranean formation.

7. The computing system of claim 5, wherein the first estimate of the initial thickness of the lithosphere comprises a sum of an initial thickness of a crust and an initial thickness of the upper mantle, and further comprising:
determining the initial thickness of the crust based at least partially upon a present-day thickness of the crust and an inversion derived stretching factor of the crust; and
determining the initial thickness of the upper mantle based at least partially upon a present-day thickness of the upper mantle and an inversion derived stretching factor of the upper mantle.

8. The computing system of claim 7, wherein the initial thickness of the crust is determined using $d_c^i = \beta_c d_c^{PD}$, where $d_c^i$ represents the initial thickness of the crust, $\beta_c$ represents the inversion derived stretching factor of the crust, and $d_c^{PD}$ represents the present-day thickness of the crust.

9. The computing system of claim 7, wherein the initial thickness of the upper mantle is determined using $d_m^i = \beta_m (d_m^{PD} - d_{mt})$, where $d_m^i$ represents the initial thickness of the upper mantle, $\beta_m$ represents the inversion derived stretching factor of the upper mantle, $d_m^{PD}$ represents the present-day thickness of the upper mantle, and $d_{mt}$ represents the amount that the upper mantle of the lithosphere varies in thickness through time.

10. The computing system of claim 5, wherein the digital crustal model is run based at least partially upon the first estimate of the tectonic subsidence through time and the first estimate of the initial thickness of the lithosphere.

11. The computing system of claim 10, wherein the amount that the upper mantle of the lithosphere varies in thickness is determined based at least partially upon the digital crustal model.

12. The computing system of claim 10, wherein the second estimate of the tectonic subsidence through time is based at least partially upon the digital crustal model.

13. The computing system of claim 5, wherein the operations further comprise:
determining a second estimate of the initial thickness of the lithosphere based at least partially upon the digital crustal model;
determining that the second estimate of the tectonic subsidence through time does not match the first estimate of the tectonic subsidence through time; and
in response, re-running the digital crustal model based at least partially upon the second estimate of the initial thickness of the lithosphere.

14. The computing system of claim 5, wherein the operations further comprise:
determining that the determined present-day thickness of the lithosphere matches an interpreted present-day thickness of the lithosphere; and
in response, generating or updating a temperature history model of the subterranean formation based at least partially upon the determined present-day thickness of the lithosphere.

15. A non-transitory computer-readable medium storing instructions that, when executed by at least one processor of a computing system, cause the computing system to perform operations, the operations comprising:
receiving geophysical data of a subterranean formation, the geophysical data comprising at least one of seismic data, gravity data, magnetic data, temperature log data, or well log data acquired for the subterranean formation;
determining a first estimate of a tectonic subsidence through time in the subterranean formation based at least partially upon a burial history of the subterranean formation;
determining a first estimate of an initial thickness of a lithosphere in the subterranean formation, wherein the first estimate of the initial thickness of the lithosphere comprises a sum of an initial thickness of a crust and an initial thickness of an upper mantle;
performing a backward inversion of the tectonic subsidence through time by running a digital crustal model of the subterranean formation, the digital crustal model representing lithospheric layer thicknesses for a plurality of lithospheric layers of the subterranean formation through geological time, the digital crustal model being generated based on the geophysical data of the subterranean formation, wherein the backward inversion is based at least partially upon one or more of the first estimate of the tectonic subsidence through time or the first estimate of the initial thickness of the lithosphere;
determining an amount that an upper mantle of the lithosphere varies in thickness through time based at least partially upon the digital crustal model;
determining a second estimate of the tectonic subsidence through time in the subterranean formation based at least partially upon the digital crustal model;
determining a present-day thickness of the lithosphere based at least partially upon one or more of the determined amount that the upper mantle of the lithosphere varies in thickness through time or the determined second estimate of the tectonic subsidence through time;
determining whether the determined present-day thickness of the lithosphere matches an interpreted present-day thickness of the lithosphere interpreted from the geophysical data;
generating or updating a temperature history model of the subterranean formation based at least partially upon determining that the determined present-day thickness of the lithosphere matches the interpreted present-day thickness; and
based on the temperature history model, predicting a likelihood and a location of hydrocarbons in the subterranean formation by determining, with the temperature history model, a timing of hydrocarbon generation and migration in the subterranean formation.

16. The non-transitory computer-readable medium of claim 15, wherein the operations further comprise:
determining the initial thickness of the crust based at least partially upon a present-day thickness of the crust and an inversion derived stretching factor of the crust; and
determining the initial thickness of the upper mantle based at least partially upon a present-day thickness of the upper mantle and an inversion derived stretching factor of the upper mantle.

17. The non-transitory computer-readable medium of claim 15, wherein the operations further comprise:
determining a second estimate of the initial thickness of the lithosphere based at least partially upon the amount that the upper mantle of the lithosphere varies in thickness through time;

determining that the second estimate of the tectonic subsidence through time does not match the first estimate of the tectonic subsidence through time; and in response, re-running the digital crustal model based at least partially upon the second estimate of the initial thickness of the lithosphere.

18. The non-transitory computer-readable medium of claim 15, wherein the operations further comprise:

determining that the present-day thickness of the lithosphere does not match the interpreted present-day thickness of the lithosphere; and in response, re-running the digital crustal model using the determined amount that the upper mantle of the lithosphere varies in thickness through time.

19. The non-transitory computer-readable medium of claim 15, wherein the operations further comprise;

generating a drilling plan, based on the predicted likelihood and location of hydrocarbons in the subterranean formation, for drilling a wellbore in the subterranean formation to access the hydrocarbons; and implementing the drilling plan to drill the wellbore.

\* \* \* \* \*